United States Patent [19]

Mallory et al.

[11] 4,015,498
[45] Apr. 5, 1977

[54] CUTTER

[75] Inventors: Edwin E. Mallory, Niles, Mich.; John R. Tolan, South Bend, Ind.

[73] Assignee: Milliken Research Corporation, Spartanburg, S.C.

[22] Filed: Sept. 24, 1975

[21] Appl. No.: 616,205

[52] U.S. Cl. .................................. 83/564; 83/199; 83/580; 83/610

[51] Int. Cl.² .................................... B26D 1/38

[58] Field of Search ............ 83/199, 200, 560, 564, 83/580, 610, 611, 612; 242/56 R, 56.1, 56.3, 56.6, 48

[56] References Cited

UNITED STATES PATENTS

| | | | |
|---|---|---|---|
| 3,052,144 | 9/1962 | Runge | 83/200 X |
| 3,149,518 | 9/1964 | Winestock | 83/199 X |
| 3,760,677 | 9/1973 | Campbell | 83/610 X |
| 3,793,917 | 2/1974 | Flower | 83/580 X |

FOREIGN PATENTS OR APPLICATIONS 1,032,949  6/1966  United Kingdom ................. 83/199

*Primary Examiner*—Othell M. Simpson
*Assistant Examiner*—Horace M. Culver
*Attorney, Agent, or Firm*—H. William Petry; Robert S. Alexander

[57] ABSTRACT

Cutting apparatus including an anvil portion having a slot therethrough, a rotatable knife portion disposed within the anvil, anvil support means swingable from an operating position to a rest position, positioning means for moving the anvil support means into an operating position and knife actuating means for rotating the knife within the anvil when the anvil is in an operating position.

2 Claims, 10 Drawing Figures

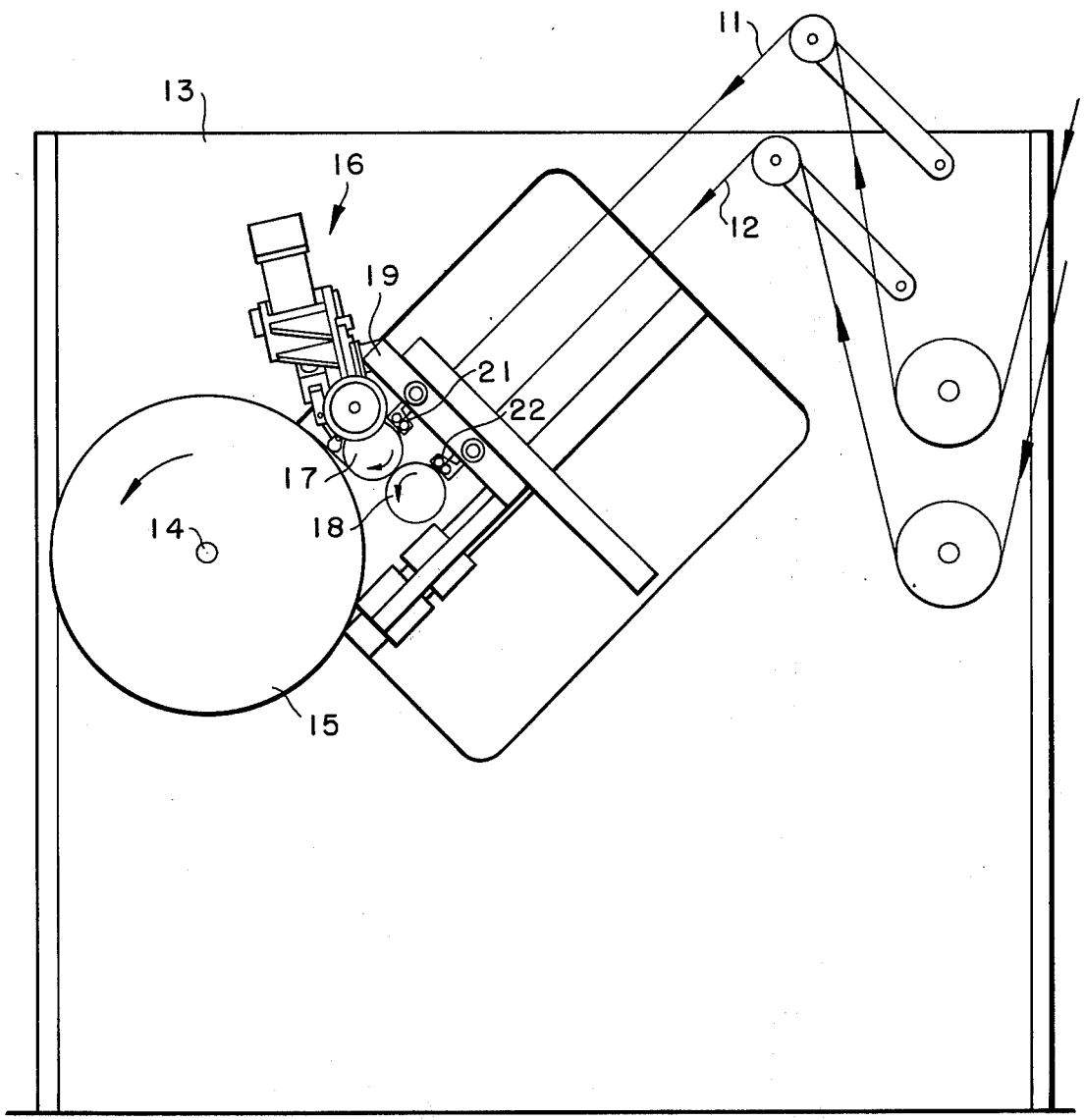
FIG. -1-

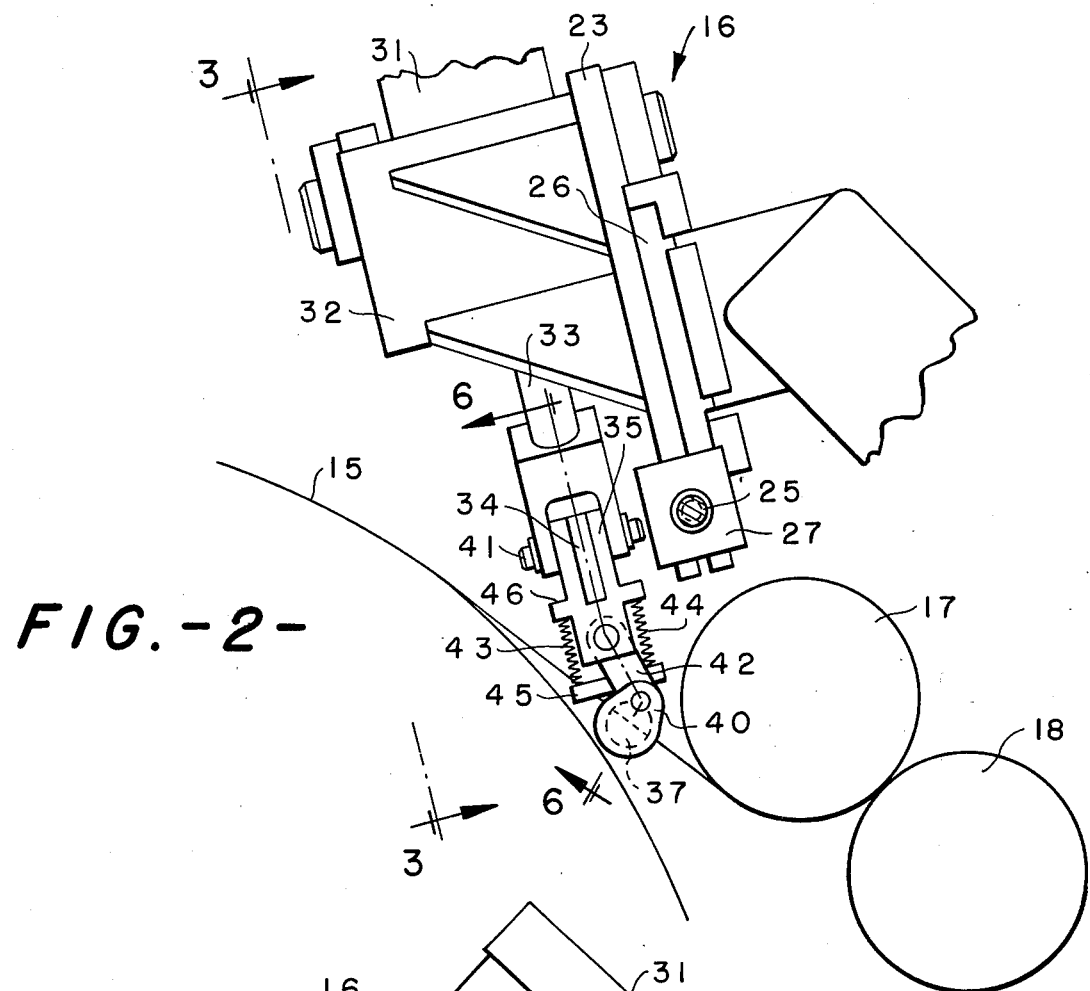
FIG.-2-
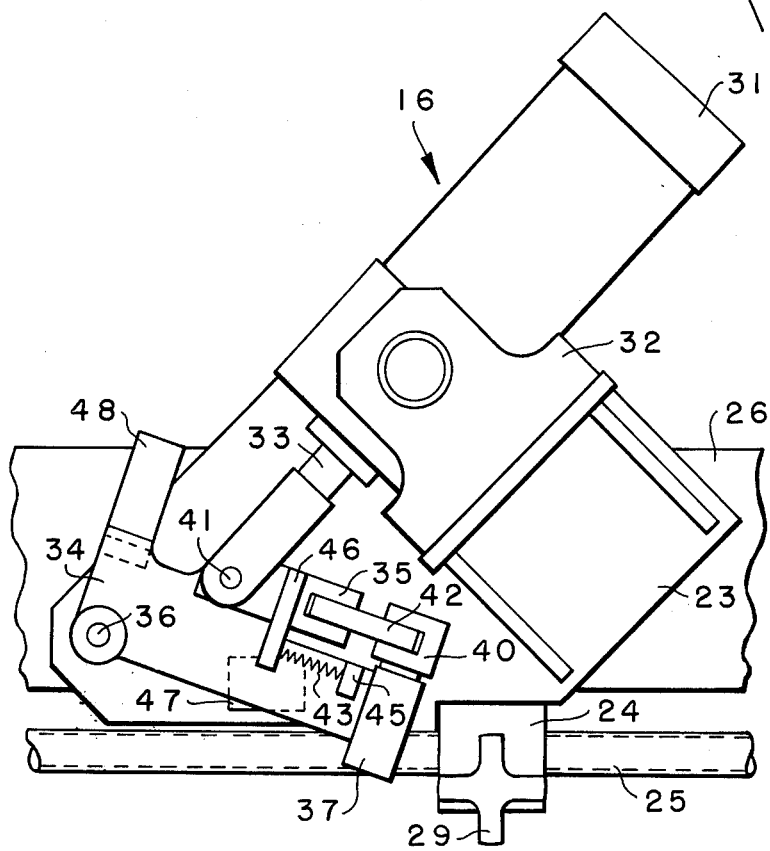
FIG.-5-

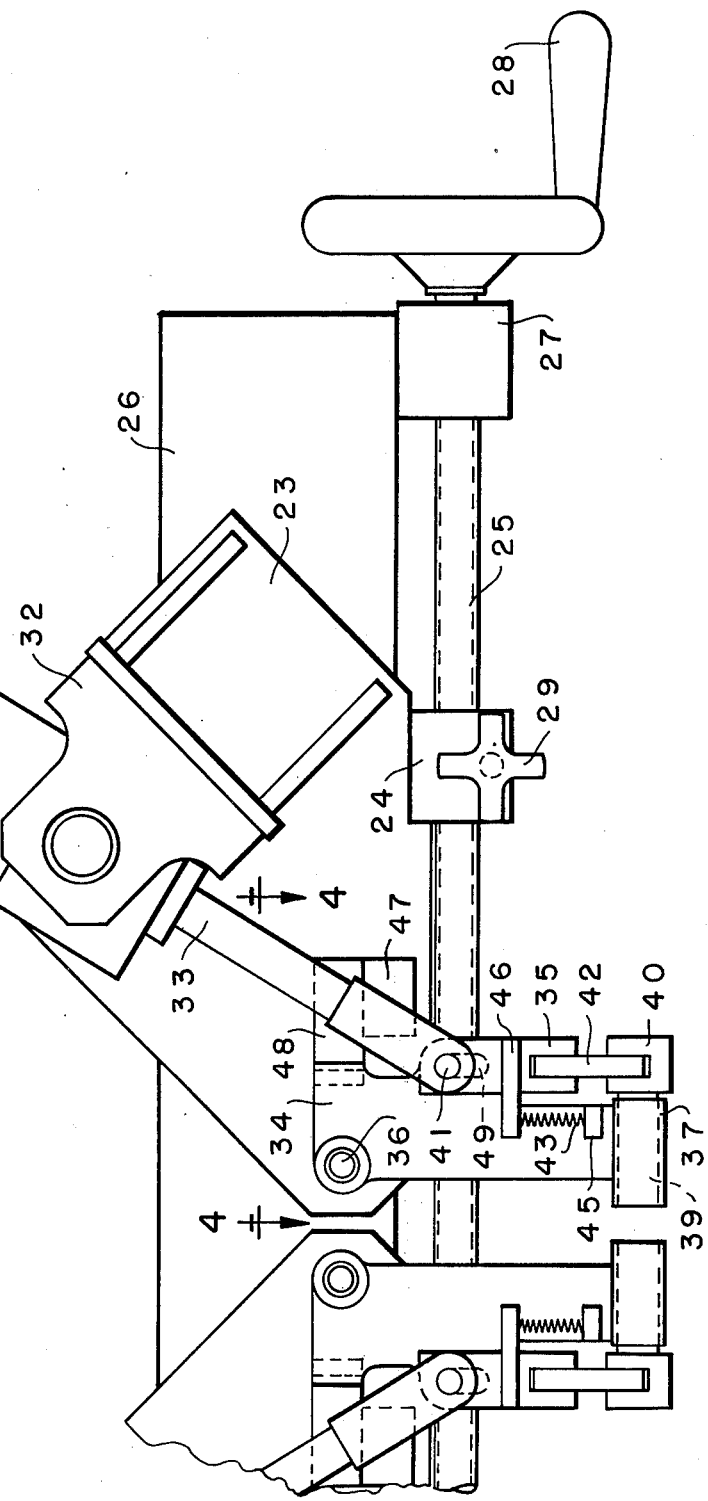

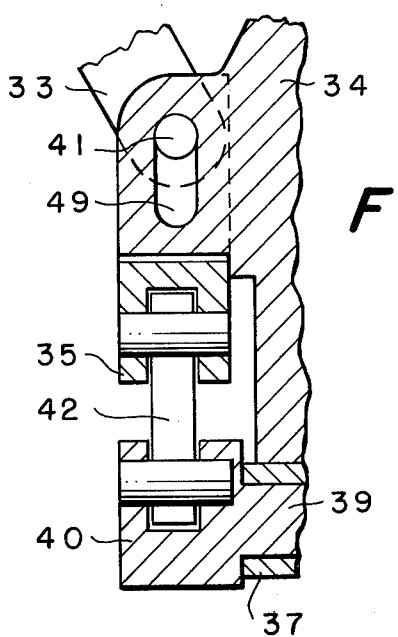
FIG.-6-
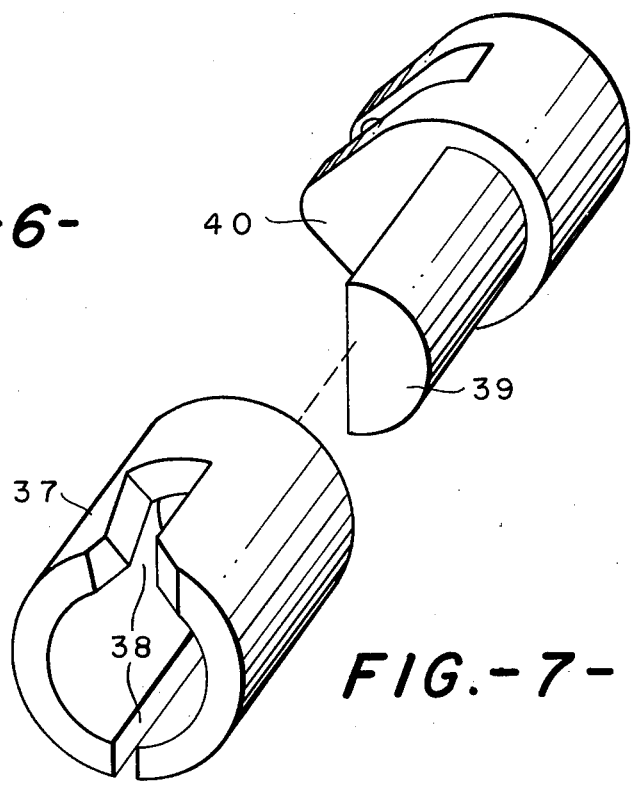
FIG.-7-
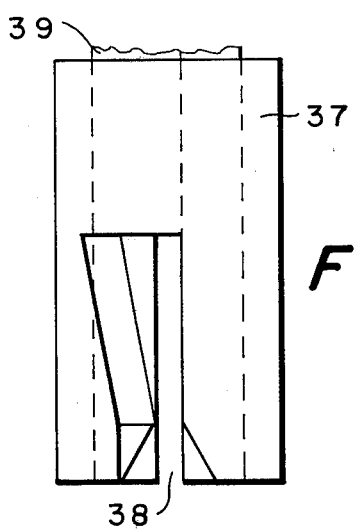
FIG.-8-
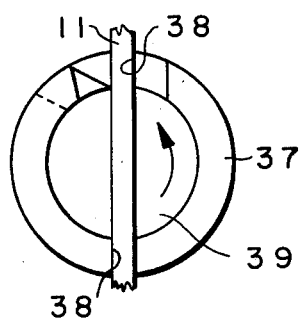
FIG.-9-
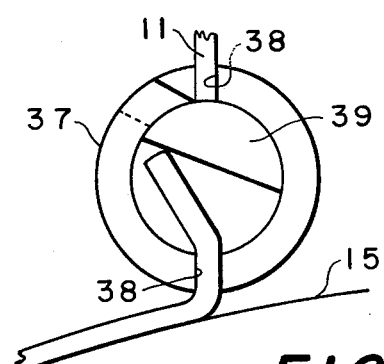
FIG.-10-

CUTTER

This invention relates to a cutter for severing a strip or cord and more particularly relates to an apparatus for cutting cords or strips containing cord reinforcement.

It has been proposed to employ continuous cords or strips in the manufacture of tread reinforcing belts for use in belted tires. Such belts may be formed by winding the cords or strips onto a rotating drum in a generally zigzag pattern employing reciprocating guides to position the cords or strips. Examples of such procedures are disclosed in U.S. Pat. Nos. 2,982,327; 3,720,569; 3,720,570; 3,748,203 and 3,761,341.

One of the problems in producing a commercially successful tire belt on a production basis is minimizing downtime between winding cycles. One factor which affects downtime is the speed with which the cords or strips can be cut when the belt is completed. It is important that the cords or strips can be automatically and quickly severed. Further, since many tire belts are made with steel wire reinforcing, the cutter must be capable of repeatedly cutting such strips with a high degree of reliability.

The present invention provides a novel apparatus for automatically and quickly cutting cords or strips including steel wire reinforcing. Moreover, the cutter of the invention minimizes strip distortion and provides for the correct positioning of the leader for the start of a new belt. In addition, the cutter permits flexibility in the location at which the strips are severed and accommodates a wide range of different belt widths. Furthermore, the apparatus of the invention provides a high degree of reliability over extended periods.

Other advantages and benefits of the invention will be apparent from the following detailed discussion and description of the drawings in which:

FIG. 1 is a schematic front elevation of one form of cutting apparatus of the invention in association with a belt winding apparatus;

FIG. 2 is an enlarged fragmentary view of the cutter shown in FIG. 1;

FIG. 3 is a view taken along line 3—3 of FIG. 2;

FIG. 4 is a view taken along line 4—4 of FIG. 3;

FIG. 5 is a view of the cutter shown in FIG. 3 in a retracted position;

FIG. 6 is a view taken along line 6—6 of FIG. 2;

FIG. 7 is an enlarged perspective view of the knife and anvil of the cutter;

FIG. 8 is an enlarged top view of the knife and anvil shown in FIG. 7;

FIG. 9 is an enlarged end view of the knife and anvil prior to cutting the strip; and FIG. 10 is an enlarged end view of the knife and anvil after cutting the strip;

As shown in the drawings, one form of apparatus includes a frame 13 having a shaft 14 extending therefrom on which is mounted a rotatable drum 15. Positioned adjacent the drum 15 and extending from the frame area cutter 16, a press roll 17, a transfer roll 18 and a guide frame 19. Guide frame 19 has reciprocating guide members 21 and 22.

The cutter 16, as shown in greater detail in FIGS. 2, 3 and 4, is pivotally mounted on a carrier 23 which is adjustably positioned by a half nut 24 engaging threaded rod 25 carried by frame 26 through bearing 27. Threaded rod 25 has a handle 28 affixed to one end to facilitate rotation of the rod. A locking screw 29 extends from half nut 24 to lock the position of the cutter assembly on rod 25.

The cutter 16 also includes an air cylinder 31 which is pivotally mounted on section 32 extending from carrier 23. Piston rod 33 of cylinder 31 is pivotally connected through a pin 41 to a slot 49 in an extension of arm 34 and to one end of hasp 35. Arm 34 also is pivotally connected to carrier 23 through pin 36. At the end of arm 34 is affixed a cylindrical anvil 37 with a slot 38 therethrough (FIGS. 7-10). A rotatable knife 39 is disposed within cylindrical anvil 37 with a lever 40 extending therefrom. Lever 40 is connected to hasp 35 through connecting rod 42, one end of which is pivotally connected to the lever and the other end of which is pivotally connected to hasp 35. Compression springs 43 and 44 extend between ears 45 and 46 on hasp 35 and arm 34 respectively. A stop 47 is located on carrier 23 to engage a finger 48 extending from arm 34 and thereby limit the swing thereof.

In the operation of the apparatus shown in the drawings, strips 11 and 12 are drawn by rotation of drum 15 through guide members 21 and 22 around rolls 17 and 18 onto the surface of the drum. Rotation of the drum is continued until the desired winding pattern has been completed at which time rolls 17 and 18 together with guide members 21 and 22 are withdrawn a short distance from the drum surface and the operation of the cutter 16 is initiated. As piston rod 33 advances from cylinder 31, arm 34 pivots about pin 36 moving from a rest position shown in FIG. 5 into an operating position shown in FIG. 3 with the slot 38 of anvil 37 engaging the strip 11. Movement of arm 34 is stopped by the contact of finger 48 with stop 47. Continued advance of piston rod 33 overcomes the bias of springs 43 and 44 and causes hasp 35 to be moved with respect to arm 34 so that connecting rod 42 moves lever 40. This rotates knife 39 within anvil 37 from the position shown in FIG. 9 to that shown in FIG. 10 severing the strip.

The knife and anvil as shown in FIG. 10 hold the leader of the strip within slot 38 of anvil 37 in proper position to be pressed against the surface of drum 15 until the cutter is withdrawn to a rest position by the retraction of piston rod 33 and press roll 17 is advanced into contact with the drum surface. Further rotation of drum 15 draws the strip onto the surface thereof and traversing of the guide members 21 and 22 forms the proper pattern. Upon completion of the belt, cylinder 31 again is actuated moving the cutter 16 into an operating position so that the slot thereof engages the strip adjacent the surface of the drum and continued advance of piston rod 33 rotates knife 39 within anvil 37 and severs the strip as described above.

While the above discussion describes the operation of a single cutter 16, as shown in FIG. 3, a second cutter operating in the same manner may be positioned on threaded rod 25 in a mirror image relationship for the cutting of strip 12.

The above description and drawings show that the present invention provides a novel apparatus for cutting cord or strip. Furthermore, the apparatus of the invention provides a reliable means for repeatedly cutting strips including steel wire reinforcing. Also, the cutter of the invention has flexibility of operation for different belt patterns and widths. In addition, the cutter of the invention has a protected cutting edge and a pivot point on the axis of rotation. Moreover, the cutter provides a clamping action to hold the position of the strip leader. Further, the positioning of the cutter and the cutting action are actuated with a cylinder and piston acting in a single stroke while insuring that the cutter is properly positioned prior to severing of the strip.

It will be apparent that modifications and variations in the apparatus described in detail and shown in the drawings may be made within the scope of the invention. For example, the arrangement of the various elements may be changed to meet space limitations. Therefore, the invention is to be limited only by the following claims.

That which is claimed is:

1. Apparatus to cut a length of material comprising: a frame, anvil means pivotally secured to said frame out of the path of travel of the length of material, knife means rotably supported within said anvil means, said anvil means having a slot therein adjacent said knife means, bias means operably associated with knife means to prevent the actuation of said knife means until said anvil is pivoted into position with the slot telescoping the length of the material, means to automatically pivot said anvil means into a position with said slot telescoping the length of material and overcome said bias means to rotate said knife means to cut the length of material located in said slot.

2. Cutting apparatus including an anvil portion having a slot therethrough, a rotatable knife portion disposed within said anvil, anvil support means swingable from an operating position to a rest position, positioning means for moving said anvil support means into an operating position and knife actuating means for rotating said knife within said anvil when said anvil is in an operating position, said positioning means and knife actuating means being a cylinder and piston acting in a single stroke, said knife actuating means including biasing means to prevent actuation of said knife before said anvil support means is in an operating position.

* * * * *

UNITED STATES PATENT OFFICE
CERTIFICATE OF CORRECTION

Patent No. 4,015,498      Dated April 5, 1977

Inventor(s) Edwin E. Mallory and John R. Tolan

It is certified that error appears in the above-identified patent and that said Letters Patent are hereby corrected as shown below:

Column 1, line 34, insert --operation-- after "extended".

Signed and Sealed this

Twenty-first Day of June 1977

[SEAL]

Attest:

RUTH C. MASON
*Attesting Officer*

C. MARSHALL DANN
*Commissioner of Patents and Trademarks*